(12) United States Patent
Zlotnick et al.

(10) Patent No.: US 10,853,122 B2
(45) Date of Patent: Dec. 1, 2020

(54) DYNAMICALLY SELECTING OPTIMAL INSTANCE TYPE FOR DISASTER RECOVERY IN THE CLOUD

(71) Applicant: EMC IP Holding Company LLC, Hopkinton, MA (US)

(72) Inventors: David Zlotnick, Tel Aviv (IL); Assaf Natanzon, Tel Aviv (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 72 days.

(21) Appl. No.: 16/380,780

(22) Filed: Apr. 10, 2019

(65) Prior Publication Data
US 2020/0326964 A1     Oct. 15, 2020

(51) Int. Cl.
*G06F 9/455*     (2018.01)
*G06F 11/14*     (2006.01)

(52) U.S. Cl.
CPC ...... *G06F 9/45558* (2013.01); *G06F 11/1469* (2013.01); *G06F 2009/45595* (2013.01); *G06F 2201/815* (2013.01)

(58) Field of Classification Search
CPC ....... G06F 9/45558; G06F 2009/45595; G06F 11/1469; G06F 2201/815
See application file for complete search history.

(56) References Cited

U.S. PATENT DOCUMENTS

| | | | |
|---|---|---|---|
| 2010/0223447 A1* | 9/2010 | Serebrin | G06F 9/30087 712/225 |
| 2013/0185667 A1 | 7/2013 | Harper et al. | |
| 2015/0074662 A1* | 3/2015 | Saladi | G06F 30/33 718/1 |
| 2016/0048408 A1 | 2/2016 | Madhu et al. | |
| 2016/0188474 A1* | 6/2016 | Wang | G06F 12/109 711/119 |
| 2017/0177324 A1* | 6/2017 | Frank | G06F 16/173 |
| 2019/0163460 A1* | 5/2019 | Kludy | H04L 67/1097 |
| 2019/0173764 A1* | 6/2019 | Di Martino | H04L 41/24 |

OTHER PUBLICATIONS

International Search Report and Written Opinion issued in Application No. PCT/US2019/066637 dated Apr. 6, 2020.

* cited by examiner

*Primary Examiner* — Tuan C Dao
(74) *Attorney, Agent, or Firm* — Workman Nydegger (57) ABSTRACT

One example includes performing a VM restore instance type discovery process, creating a test VM with a VM restore instance type matching a VM restore instance type identified during discovery, using the test VM to create a test restore VM at a cloud storage site, restoring the test VM at the cloud storage site using the test restore VM, generating a 4-D baseline vector based on the restoration of the test VM, the 4-D baseline vector identifying a particular VM restore instance type, generating a 5-D vector based on the 4-D baseline vector, ranking the 5-D vector relative to other 5-D vectors, the 5-D vectors identifying the same production site VM, and restoring, at the cloud storage site, the production site VM identified in the 5-D vectors, the production site VM restored at the cloud storage site has a VM restore instance type identified in the highest ranked 5-D vector.

20 Claims, 3 Drawing Sheets

DYNAMICALLY SELECTING OPTIMAL INSTANCE TYPE FOR DISASTER RECOVERY IN THE CLOUD

FIELD OF THE INVENTION

Embodiments of the present invention generally relate to data protection. More particularly, at least some embodiments of the invention relate to systems, hardware, software, computer-readable media, and methods for selecting, in view of various competing considerations, an optimal virtual machine (VM) instance type for cloud-based disaster recovery.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Thus, disaster recovery (DR), that is, recovery and restoration of backed up data after a problem or loss has occurred, is an important process for organizations. One approach to disaster recovery is to create a temporary restore VM in a cloud storage environment. When called upon, the VM executes a disaster recovery process. This approach, however, has proved problematic for various reasons.

For example, the disaster recovery process may take a long time to perform for a large VM. As well, the cost for the disaster recovery process would be accordingly high, since cloud usage is typically paid on an hourly basis. On the other hand, a smaller VM may instead be employed for DR, but the smaller VM would lack some of the functionality of the larger VM. Consequently, the organization may have to strike a balance between, for example, the speed with which a DR process is required to be performed, and the cost for performing that process.

Thus, one challenge facing organizations is deciding which cloud instance type would be the most optimal for performing the various restore tasks assigned to the VM for execution. A simple approach might be to select the least expensive, in terms of cloud usage cost, VM restore instance type in the cloud, such that the price for each hour of restore activity performed by that VM will be minimized. However, it may be possible that selecting a higher performance VM restore instance type, despite being more expensive, will lead to overall cost saving because the restore work will be completed relatively more quickly. In this hypothetical case, the customer might benefit from both quicker completion of DR and a lower price paid for restore activity.

Still other factors complicate the analysis with respect to which VM type will be used for a DR process. Such factors include, but are not limited to, different customer VM sizes and/or types, and differing customer preferences with respect to the speed/cost tradeoff for different respective VMs.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for selecting, in view of various competing considerations, an optimal virtual machine (VM) instance type for cloud-based disaster recovery.

More particularly, example embodiments of the invention embrace, among other things, automated processes for selecting an optimal restore instance type in order to optimize the restore cost and time for the customer, while also improving the overall customer experience. Some useful and advantageous aspects of the invention will be apparent in light of the following hypothetical examples.

Among other things, example embodiments of the invention are well suited to deal with the complexity of having to select an optimal restore instance type. A temporary restore VM that is to be used to execute a DR process in the event of a DR event may perform restore processes including, but not limited to, creating disks of the same sizes as the protected VM of the customer, reading the backup data copies from cloud storage and writing those copies to the newly created disks, and then installing the required device drivers on the target VM. In at least some instances, the temporary restore VM resides in a cloud datacenter, while the target VM, with respect to which the temporary restore VM performs a DR process, is located on-premises at a customer site.

Selection of the optimal restore instance, that is, the optimal temporary restore VM, may depend on the original size of the customer VM. To illustrate, for a VM of 2 TB size, the optimal restore instance may be different than for a VM of 100 GB. Also some instance types could be available only in certain cloud regions. As well, the priority of some customers may be to reduce the DR cost, while other customers may prefer a faster DR time and are not as concerned with the DR cost. A customer preference, for example, with respect to cost versus speed, may be dependent on considerations such as the RTO (Recovery Time Objective) of the specific VM that needs to be recovered. As these examples illustrate, a variety of competing considerations may come into play, and thus lend complexity, when a decision has to be made regarding an optimal restore instance type.

As an additional complication, predefining an optimal VM restore instance type based on manual tests is difficult, or impossible, in at least some instances. For example, new VM restore instance types are being introduced by major cloud vendors from time to time. Also, cloud vendors pricing models may change over time. Thus, VM restore instance type evaluations should be performed repeatedly, with many instance types across many regions, to ensure that the optimal VM restore instance type(s) is/are being employed. For these reasons, example embodiments of the invention embrace methods and processes for automatically selecting an optimal VM restore instance type for DR processes.

With these points in view, example embodiments of the invention provide for automation of the selection of optimal restore instance type (RI type) per any specific customer VM based on the speed/cost tradeoff resolution policy (TR policy) of that customer, for that specific VM. Thus, some example embodiments of the disclosed system periodically perform an automated restore activity on a small baseline test VM of a predefined size using different restore VM restore instance types that are available for a given cloud vendor, one example of which is Amazon Web Services (AWS) Simple Storage Service (S3). Based on the time that takes to complete the restore activity for the baseline test VM with a specific restore instance type, embodiments of the invention are able to deduce the time it will take to complete the restore for any customer VM of any other size. Thus, the time that is required to restore any customer VM, per specific instance type, can be calculated. Likewise, the hourly cost of any VM restore instance type per each cloud vendor, and per each region, is also known.

As a result, per each customer VM, and each VM restore instance type, the restore completion time (RC time) and restore completion price (RC price) are known. The speed/cost tradeoff resolution policy (TR policy) per each VM will be provided by the customer. By way of illustration, some simple example policies include "prefer lowest cost" or "prefer highest (restore) speed."

Then, per each customer VM and VM restore instance type, a resolution function is applied based on restore time and restore cost arguments. The instance type that receives the highest rank, per the resolution function, is then selected for the specific customer VM. For example, RANK=TR policy[RC time, RC price]. When a full DR Test, or a real DR Failover, is performed with respect to that specific customer VM, the pre-defined restore instance type will be used.

Advantageously then, some embodiments of the invention may provide various benefits and improvements relative to the configuration and operation of conventional hardware, software, systems and methods. To illustrate, an embodiment of the invention may provide processes for automatically configuring a restore VM instance based on a plurality of competing considerations. Further, an embodiment of the invention can periodically, and automatically, evaluate the operating environment to identify changes in parameters of the environment where the restore VM will be implemented. Finally, an embodiment of the invention can configure/reconfigure a restore VM automatically in response to one or more of such parameter changes.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients. Some examples of storage environments in which embodiments of the invention can be employed include, but are not limited to, cloud datacenters such as Amazon AWS, Microsoft Azure, and Google cloud.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
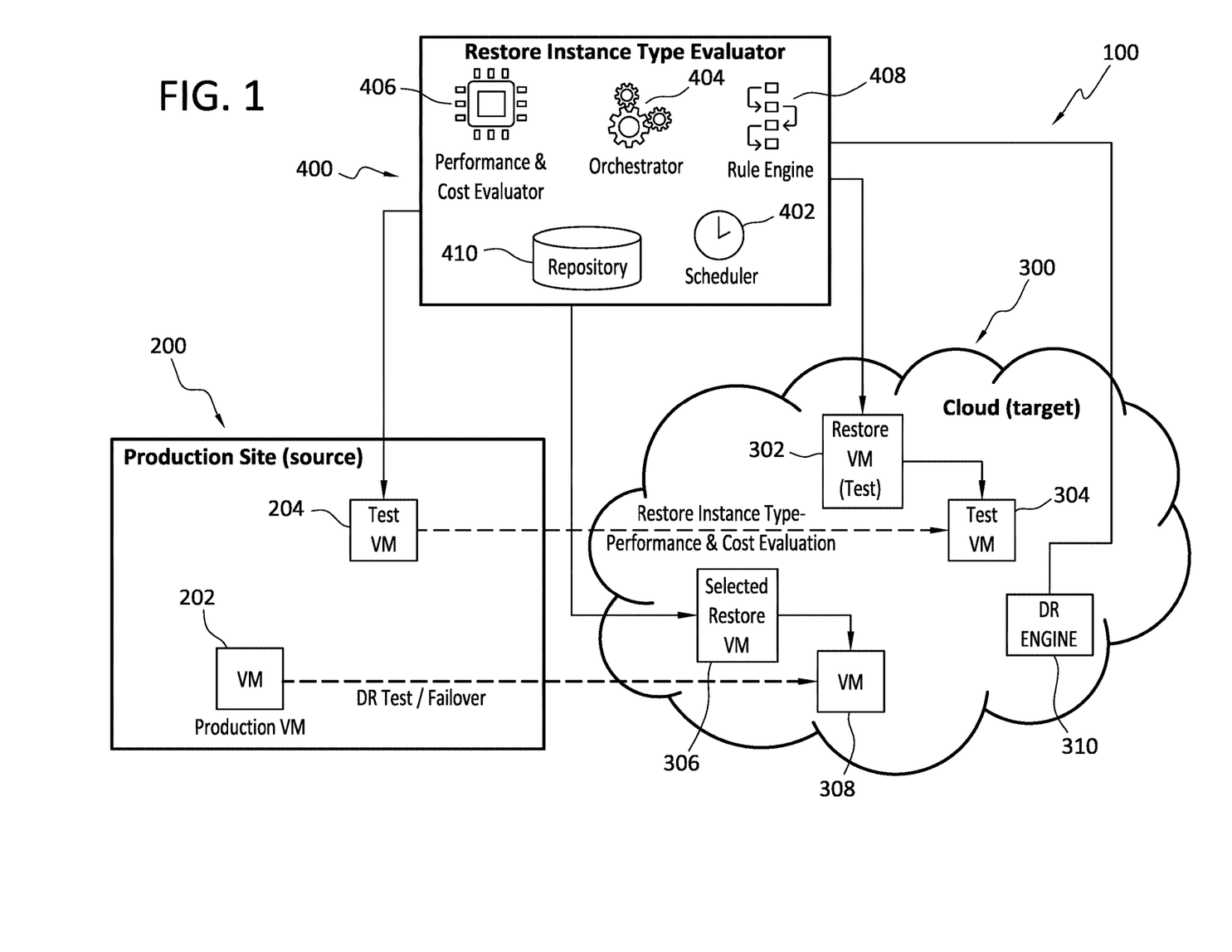
FIG. 1 discloses aspects of an example operating environment for some embodiments of the invention.

With attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

As indicated, the example operating environment 100 configuration in FIG. 1 comprises a production site 200, cloud storage site 300, and a restore instance type evaluator (RITE) site 400. All of these elements are configured to, and do, communicate with each other in connection with the implementation of various embodiments of the invention. In general, one or more production VMs operate at the production site 200 and/or at the cloud site 300. In order to provide for disaster recovery of a production VM in the event that a problem occurs at the production site 200, a temporary restore VM, corresponding to the production VM, is created at the cloud site 300.

The temporary restore VM, which may also be referred to herein as a restore VM instance, resides at the cloud site 300 and is operable to perform various DR processes, in the event that a problem occurs involving one or more production VMs that are associated with the restore VM instance. The particular type of restore VM instance, or restore VM restore instance type, is determined by the RITE 400, based at least in part on criteria identified by an administrator or other user.

When called upon, or automatically, as a result of a disaster involving the production site 200, the restore VM instance residing at the cloud site 300 performs various DR operations. These DR operations may include, but are not limited to, building, at the cloud site 300, a VM that corresponds to the production VM upon which the restore VM instance was based. In this way, the functionality of the production site 200 VM is restored at the cloud site 300 and is available for use, notwithstanding the occurrence of a problem at the production site 200. In some instances, the VM that was built at the cloud site 300 by the restore VM instance may additionally, or alternatively, be restored to the production site 200 after the production site 200 problem has been resolved.

Because the VM that was built at the cloud site 300 by a restore VM instance of a particular type specified by an administrator or other use, that VM is restored in a manner that is consistent with parameters set by that administrator or other user. Such parameters include, but are not limited to, the cost to restore the VM, the speed with which the VM is restored, and the functionality desired in the restored VM. A restore VM instance of a particular type, where the type is determined in whole or in part by the RITE 400, may be referred to herein as an optimal VM restore instance type. A single optimal VM restore instance type can be used to restore a single VM, or multiple VMs, to the cloud storage site 300 and/or to the production site 200.

With particular reference now to FIG. 1, further details are provided concerning aspects of the example operating environment 100 and associated elements. As noted, the operating environment 100 may include a production site 200, one example of which is an on-premises site of an enterprise or other organization. New and/or modified data is generated at the production site 200, including one or more VM instances such as the VM instance 202. The VM instance 202 may be referred to as a production VM since it is created at, and/or operates at, the production site 200. The production site 200 may be considered as a data source. Embodiments of the invention may operate in connection with any number or type of data sources.

The new and/or modified data generated at the production site may be desired to be protected so that such data can be restored at one or more sites in the event that a problem, such as loss or corruption of data for example, occurs that compromises that data in some way. As noted, embodiments of the invention provide for specification of a particular VM restore instance type operable to restore one or more corresponding VMs. To this end, the production site 200 also includes a baseline test VM 204 that, typically, is smaller than that of the production VM 202. In some embodiments, the baseline test VM 204 may comprise components that are common across a customer population of production VMs 202. To illustrate, the baseline test VM 204 may comprise the same type and number of disks as the VMs in the population of production VMs 202. As well, the baseline test VM 204 may lack components and attributes that, while present in one or more production VMs 202, are not common across the population of production VMs 202, and/or the baseline test VM 204 may comprise relatively less data than any of the production VMs 202. Thus, the baseline test VM 204 may be considered as a 'least common denominator' VM with respect to the production VMs 202 in the population.

In general, and as discussed in more detail elsewhere herein, automated restore processes are performed on the baseline test VM 204 using different restore VM restore instance types. In this way, relative determinations can be made as to the amount of time that may be involved in restoring customer VMs of various respective sizes. These automated restore processes performed with respect to the baseline test VM 204 may be initiated and/or performed by the RITE 400 automatically on an ad hoc or scheduled basis, and/or in response to user input or initiation. In some instances, an automated restore process may be performed by the RITE 400 on the baseline test VM 204 whenever a new VM restore instance type is implemented by, for example, the owner/operator of the cloud storage site 300.

As further indicated in FIG. 1, the RITE 400 may create a restore VM (test) 302 at the cloud storage site 300. The restore VM (test) 302 is created based upon the baseline test VM 204 and, as such, the restore VM (test) 302 is operable to perform a DR process, such as creating test VM instance 304 of the baseline test VM 204 at the cloud storage site 300. Creation of the test VM instance 304 by the restore VM (test) 302 may involve the performance of various processes by the restore VM (test) 302 such as, but not limited to, creating disks of the same sizes as the disks of the test VM 204, reading the backup data copies of the test VM 204 from cloud storage 300 and writing those copies to the newly created disks, and then installing the required device drivers on the test VM instance 304.

The restore VM (test) 302 may be created by the RITE 400 based on a particular VM restore instance type that can be specified, for example, by a user, or automatically by the RITE 400 for example. The VM restore instance type may be specific to a particular cloud storage 300 provider or environment. Various other criteria, such as cost to restore (RC price) and time to restore (RC time), for example, may be used by the RITE 400 as a basis to create the restore VM (test) 302. After the restore VM (test) 302 has been created that reflects these criteria, the restore VM (test) 302 can then be run to create the test VM instance 304.

It will be appreciated that any number of restore VM (test) 302 may be created, and then run to create any number of test VM instances 304. Moreover, the creation, and running, of one or more restore VMs (test) 302 can be performed ad hoc, on a recurring basis, automatically, on an irregular basis, in response to the occurrence or non-occurrence of an event, or on any other basis. In some embodiments, the restore VM (test) 302 may be deleted from cloud storage 300, such as when the restore VM restore instance type of the restore VM (test) 302 is no longer supported by the cloud storage 300 provider. The same is likewise true with respect to a test VM instance 304 that was created by that restore VM (test) 302.

B. Aspects of an Example Restore Instance Type Evaluator (RITE)

With continued reference to FIG. 1, further details are provided concerning the example RITE 400. In general, the RITE 400 may reside on-premises at the production site 200 or, alternatively, the RITE 400 may be an element of the cloud storage site 300. In still other embodiments, the RITE 400 may reside at a site other than the production site 200 or the cloud storage site 300.

In terms of its operation, the RITE 400 may create and run one or more selected restore VMs 306, each of which is operable to create a corresponding VM 308 that corresponds to a respective VM instance 202 of the production site 200. In general, creation of a restore VM 306 may be performed by the RITE 400 after various criteria, which may correspond to a particular VM restore instance type, have been specified concerning the processes that will be used by the restore VM 306 to create the VM 308. Such criteria may include, but are not limited to, the cost for the restore VM 306 to restore (RC price) the VM 308, and the amount of time needed for the restore VM 306 to restore (RC time) the VM 308. The cost to restore may be based on the price structure, such as $/GB, imposed by the operator of the storage site 300. In at least some instances, the cost to restore may be relatively higher for large/complex VMs and relatively smaller for small/simple VMs, although this is not necessarily the case.

With particular reference now to the RITE 400, further details are provided concerning evaluation of various VM restore instance types, such as may be performed by the RITE 400. In general, the RITE 400 operates to automate the selection of optimal VM restore instance type (RI type) per any specific customer VM based on criteria such as the speed/cost tradeoff resolution policy (TR policy) of that customer, for that specific VM.

The RITE 400 will periodically perform an automated restore activity on the small baseline test VM 204 of a predefined size, using different restore VM restore instance types that are available for a given cloud storage site 300 vendor. That is, and as explained above, the RITE 400 will create a restore VM (test) 302 that is operable to restore the baseline test VM 204 as test VM 304 at the cloud storage site 300. As a result of performing a restore of the baseline test VM 204, both the time and the cost to restore the baseline test VM 204 are known.

Based on the time that is needed to complete the restore activity for the baseline test VM 204 with a specific restore instance type, the RITE 400 will approximately, at least, deduce the time it will take to complete a restore for any customer VM 308 of any other size, and having the same VM restore instance type as specified in connection with the automated restore of the baseline test VM 204. Thus, the time that is required to restore any customer VM 308, of a specific VM restore instance type, can be calculated based on performance of the restore of the baseline test VM 204. As well, the hourly cost of restoring any VM restore instance type per each cloud vendor, and per each geographical region, is also known. With this time and cost information known, the customer can then generate a DR plan for its VMs.

In particular, the restore completion time (RC time) and restore completion price (RC price) is known, or determined, for each VM restore instance type of each particular customer for each region of that customer. Thus, the customer, that is, the operator of the production site 200, can generate and provide a speed/cost tradeoff resolution policy (TR policy) per each VM of the customer. Alternatively, the RITE 400 can generate the policies based on input received from the customer. As noted elsewhere herein, the policy for any particular VM could be very simple, such as "prefer lowest cost" or "prefer highest speed," or the policy may be derived from the protection policy settings for that VM, or VM restore instance type.

In more detail, for each customer VM, each of which is associated with a corresponding VM restore instance type, a resolution function is applied based on restore time and restore cost arguments. The VM restore instance type that receives the highest rank, by application of the resolution function, is then selected for the specific customer VM (rank=TR policy[RC time, RC price]), and the selected restore VM, of the specified VM restore instance type, such as the restore VM 306, is stored at the cloud storage site 300. When a full DR Test or a real DR Failover is performed with respect to that specific customer VM, the restore VM creates the corresponding VM.

To illustrate briefly with an example, when a full DR Test or a real DR Failover is performed with respect to VM 202, the restore VM 306, being of the specified restore VM restore instance type, then runs various DR processes to create the VM 308 at the cloud storage site 300. Because the restore VM 306 is of the specified VM restore instance type, the VM 308 is created by the restore VM 306 according to attributes specified by a user and captured in a particular policy applicable to the VM 202.

As shown in FIG. 1, the aforementioned, and other, functions of the RITE 400 may be performed using a group of components. For example, the RITE 400 may include a scheduler 402. The scheduler 402 determines when VM restore instance type discovery activity is performed in a system. The orchestrator 404 is invoked based upon a schedule generated by the scheduler 402.

More particularly, the orchestrator 404 interacts with a VM instance performance and cost evaluator 406. The orchestrator 404 receives, from the VM instance performance and cost evaluator 406, a 4-dimensional vector of the form [region, RI type, RC time, RC price], where 'RI type' refers to a particular VM restore instance type. Thus, the 4-dimensional vector corresponds to the baseline test VM 204, and not to any particular customer VM 202. A baseline, that is, 4-dimensional, vector can be generated for each different RI type in a particular customer region.

As noted, the VM restore instance type, or types, may be specified by a cloud storage provider, or other entity. Thus, the 4-dimensional vector indicates a customer region, a specified VM restore instance type, as well as the restore parameters of time to restore, and a cost to restore, that were measured when performing a restore of the test VM 204 of the specified VM restore instance type in the specified customer region. As noted earlier, the restore of the test VM 204 comprises the creation, by the restore VM (test) 302, of the test VM 304. Thus, the 4-dimensional vector may be referred to as a baseline vector since it is not specific to any particular VM, but is used, as discussed below, as a baseline to create respective 5-dimensional vectors that are each specific to a particular respective VM.

In particular, based on the 4-dimensional vector generated in connection with restoration of the test VM 204, the orchestrator 404 generates a 5-dimensional vector [region, VM, RI type, RC time, RC price]. Thus, each 5-dimensional vector identifies, among other things, a particular customer VM and customer region. That is, there is a particular 5-dimensional vector for each customer VM in a given region. As well, the RC time and RC price for that particular customer VM are defined by the orchestrator 404 based on the ratio of customer VM size to testing VM size, such as the ratio of VM 202 size to test VM 204 size (that is, [customer VM size/testing VM size]) that was obtained.

By way of illustration, a customer VM 202 that is about 10 times bigger than the baseline test VM 204, may be expected to have respective restore cost and restore times that are about 10 times higher than the restore cost and restore times of the baseline test VM 204. Since the restore cost and restore time for the test VM are known from the testing VM process, the restore cost and restore time for the actual customer VM 202 can be readily determined using that information in conjunction with the known ratio of VM size to test VM size. As the foregoing example illustrates, each 5-dimensional vector thus contains restore time (RC time) and restore cost (RC cost) information that is specific to a particular customer VM/region and are derived from information collected during baseline testing.

With continued reference to the RITE 400 in FIG. 1, the orchestrator 404 interacts with a rule engine 408 and, for each customer region/VM, the orchestrator 404 will provide the rule engine 408 a speed/cost tradeoff resolution (TR) policy and a specific entry, that is, a particular 5-dimensional vector associated with a particular customer VM in a particular customer region. As noted elsewhere herein, the entry for a particular VM, that is, the 5-dimensional vector for that VM, may take the form: [region, VM, RI type, RC time, RC price]. The TR policy, or more generally the 'tradeoff resolution policy,' may be specified by the customer and provided to the RITE 400. The rule engine 408 and/or one, some, or all, of the other elements of the RITE 400 may be maintained by the customer.

In general, a tradeoff resolution policy (TR policy) is provided by the customer and can reflect the relative priorities of that customer with respect, for example, to restore time and restore cost. For example, a TR policy may include, as arguments, a time to restore (RC time) and a cost to restore (RC price). As such, the TR policy can be used, by the rule engine 408 for example, as a basis for ranking, and selecting, particular VM restore instance types for restoration of a particular customer VM. In at least some embodiments, the VM restore instance type that is assigned the highest rank as a result of application of the TR policy would be selected for the specific customer VM, that is, (rank or R=TR policy[RC time, RC price]).

Thus, the TR policy for a particular VM is actually a function that takes the specific 5 dimensional VM entry as a parameter or argument, and returns a number that represents rank 'R.' That is, in expanded form, the function takes the form of F [region, VM, RI type, RC time, RC price]=R. The rule engine 408 applies this function, which can embody a formula such as is discussed below, and returns a number that represents a rank.

Generally, the rank assigned by the rule engine 408 to a particular entry can reflect how closely the RC time and RC price, in the entry, match an RC time and RC price specified by the customer for the specified VM, RI type, and region. To illustrate with one example, a customer might specify that restore time is weighted as 75% in importance, while restore cost is weighted as 25% in importance. Put another way, restore time is 3× as important to this particular customer as restore cost. Thus, for the rule engine 408 to generate a score for ranking purposes, using the 75/25 example above, the RC time for each entry can be multiplied by 0.75 and the RC cost for each entry can be multiplied by 0.25, and the two products then summed ((RC time×0.75)+ (RC cost×0.25)) to produce an aggregate score 'AS.'

It should be noted that while entries can be ranked by their respective AS, as described above, the scope of the invention is not limited to use of the AS formula. More generally, any other formula can be used to rank the entries. As such, the AS formula is presented only by way of illustration, and not limitation.

Accordingly, other formulas and approaches can also be used as a basis for determining the rank of an entry. For example, a function can be employed that selects the fastest VM restore instance type using the following ranking function: F [region, VM, RI type, RC time, RC price]=R=1/RC time. In this example, the higher the RC time, the lower the rank that will be returned. As another example, a function can be employed that selects the least expensive VM restore instance type. More generally, any function can be employed that can be used as a basis for ranking a group of entries. Thus, the scope of the invention is not limited to the examples disclosed herein.

After iterating over all entries per region/VM, the orchestrator 404 then selects the entry with highest rank, as reflected by the AS, or other formula, and saves the triplet of [region, VM, RI type], corresponding to that highest rank, in the system data repository 410. This triplet can then be used to restore the production VM 202, or production VMs 202, to which it corresponds.

With continued reference to FIG. 1, further details are provided concerning various components of the RITE 400. For example, the performance and cost evaluator 406 runs the restore of a baseline test VM of predefined size per each instance type that is available in each region and produces the 4 dimensional vector [region, RI type, RC cost, RC price]. As well, the rule engine operates to generate a number (rank) based on (i) the provided speed/cost tradeoff resolution policy provided by the customer and (ii) a specific entry related to customer VM in region [region, VM, RI type, RC cost, RC price]. Finally, upon DR initiation, by a customer for example, a DR engine 310 fetches the appropriate VM restore instance type from the system data repository 410 and will create a VM restore instance(s) of that specific type.

C. Example Host and Server Configurations

Figure 2:
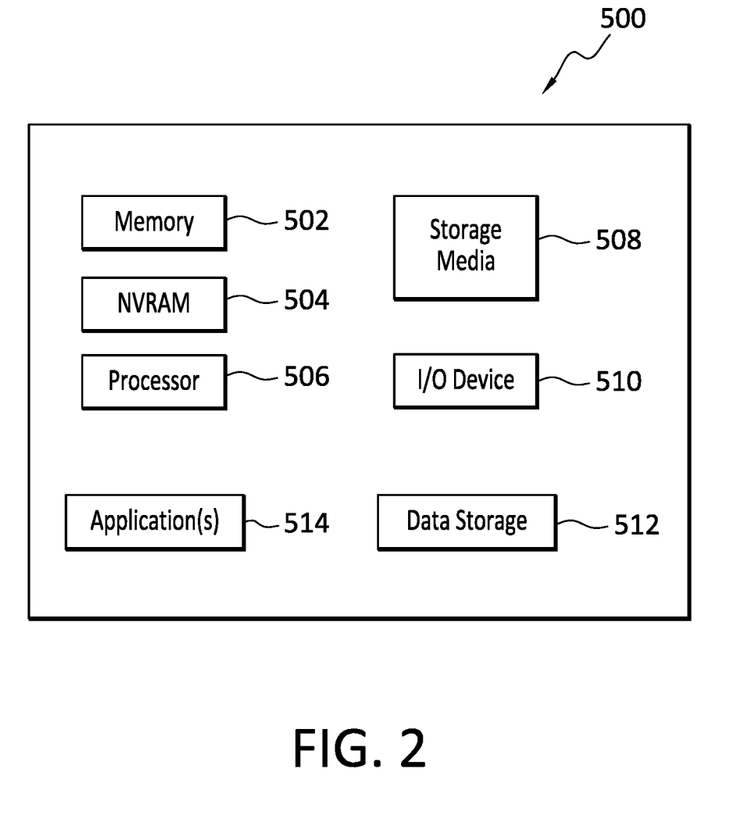
FIG. 2 discloses aspects of an example host configuration.

With reference briefly now to FIG. 2, any one or more of the production site 202, cloud storage site 300, RITE 400, and the respective components of these elements, can take the form of, or include, or be implemented on, or hosted by, a physical computing device, one example of which is denoted at 500. As well, where any of the aforementioned elements, and their respective components, comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, I/O device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premise at an enterprise, or a cloud storage site, client, datacenter, backup server, blockchain network, or blockchain network node, to perform functions disclosed herein. As well, such instructions may be executable to perform any of the other operations disclosed herein including, but not limited to, read, write, backup, and restore, operations and/or any other data protection operation, auditing operations, cloud service operation, blockchain operations, data management element operations, blockchain node operations, and blockchain ledger operations.

D. Example Methods

Figure 3:
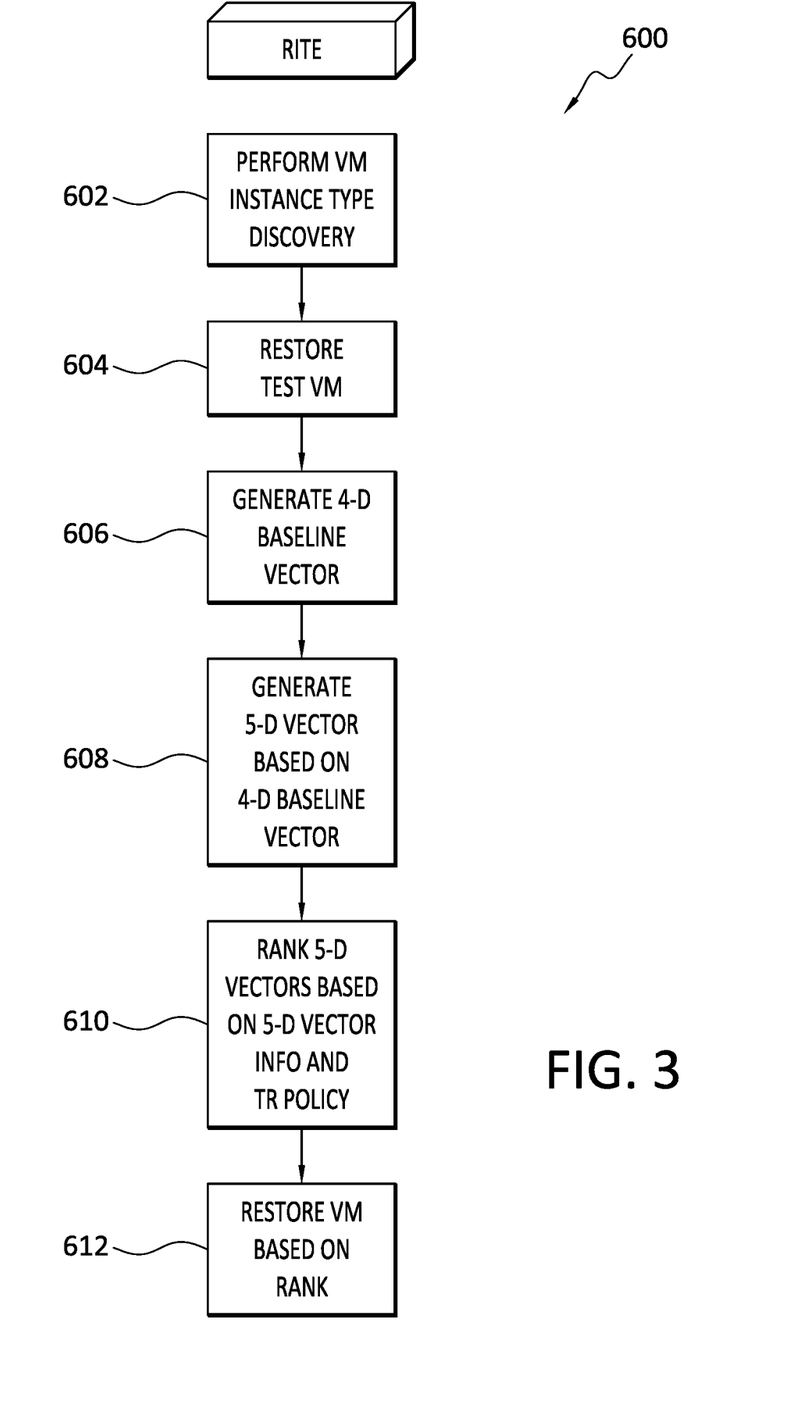
FIG. 3 is a flow diagram that discloses some general aspects of a disaster recovery method.

With attention now to FIG. 3, aspects of example methods are disclosed. One particular method is denoted generally at 600 and concerns operations involving restoration of one or more customer VMs.

The method may begin at 602 where a VM restore instance type discovery process is performed. This process 602 may be performed, for example, by an orchestrator that is invoked according to a discovery schedule generated by a scheduling engine. The discovery process 602 involves surveying one or more regions of a production site and identifying the various different VM restore instance types that are present at the production site. It is possible that any number of different VM restore instance types are present at the production site. The process 602 can be invoked and performed (i) automatically according to a schedule, (ii) responsive to the occurrence or non-occurrence of an event, (iii) on a recurring basis, (iv) on an ad hoc basis, or any combination of these. In connection with the VM restore instance type discovery process 602, the various VM restore instance types discovered can be stored in a repository, along with information such as, but not limited to, customer identity, region, the number of VMs of each type, and VM size(s).

In preparation for restoration 604 of one or more test VMs of particular VM restore instance types, one or more test VMs may be created at the production site. In general, a test VM may take the form of a baseline, or least-common-denominator VM with properties and characteristics that are common to a population of VMs at the production site. As such, the test VM(s) may be smaller in size than the respective VMs that it represents. For each of the test VMs that is created at the production site, a corresponding restore VM (test) is created at the cloud storage site. The restore VM (test) is operable to perform a DR process that results in the restoration of the test VM at the cloud storage site.

After the test VMs, and corresponding restore VM (test) have been created, one or more of the test VMs are restored 604, so as to mimic a DR process. The restoration process 604 results in the creation of a corresponding test VM at the cloud storage site. As part of the restoration process 604, test information concerning the restore process is collected. Such test information may include, but is not limited to, the time that it took to restore a test VM at the cloud storage site, and the cost to restore that test VM.

The test information is then used to generate 606 a 4-D baseline vector that is particular to a specific VM restore instance type, but is not associated with any particular VM of the production site. That is, the 4-D baseline vector is generic to one or more VM instances that all share the same VM restore instance type. The 4-D baseline vector may take the form [region, RI type, RC time, RC price], where the 'region' is a particular region of the production site, 'RI type' is the VM restore instance type, 'RC time' is the time to restore the test VM, and 'RC cost' is the cost to restore that test VM.

Using the 4-D vector, a 5-D vector that is specific to a particular VM of the production site is then generated 608. The 5-D baseline vector may take the form [region, VM, RI type, RC time, RC price], where the 'region' is a particular region of the production site, 'VM' identifies a particular VM of the production site, 'RI type' is the VM restore instance type, 'RC time' is the expected time to restore the VM, and 'RC cost' is the expected cost to restore that test VM. The expected RC time and RC cost of the 5-D vector are generated based on (i) the RC time and RC cost of the test VM that is of the same VM restore instance type as the particular VM identified in the 5-D vector, and (ii) the relation of the size of the VM to the size of the corresponding test VM.

As the foregoing suggests, multiple 5-D vectors may correspond to a given production site VM, where each 5-D vector represents a different respective VM restore instance type. Thus, the 5-D vectors are then ranked 610 to determine which VM restore instance type is best suited for restoration of the specific VM identified in the 5-D vectors. The ranking of the 5-D vectors is performed 610 based on the 5-D vectors and on the customer speed/cost tradeoff resolution policy (TR policy). The TR policy, in conjunction with the 5-D vectors, thus enables a determination to be made as to the extent to which each VM restore instance type reflects the needs of the customer. In at least some embodiments, the 5-D vectors are thus ranked from high to low, where the highest ranked 5-D vector best reflects the customer TR policy.

Once the 5-D vectors have been ranked 610, the VM identified in the 5-D vectors is then restored 612 using the VM restore instance type of the highest ranked 5-D vector. In more detail, the restore VM corresponding to the desired VM restore instance type performs a DR process at the cloud storage site to restore the VM identified in the 5-D vectors at the cloud storage site. Thus, when a problem has occurred at the production site, the production site VM is restored, and accessible, at the cloud storage VM.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    performing a VM restore instance type discovery process at a production site;
    creating a test VM with a VM restore instance type that matches a VM restore instance type identified during performance of the discovery process;
    using the test VM as a basis to create a test restore VM at a cloud storage site;
    restoring the test VM at the cloud storage site using the test restore VM;
    generating a 4-D baseline vector based on the restoration of the test VM, the 4-D baseline vector identifying a particular VM restore instance type;
    generating a 5-D vector based on the 4-D baseline vector;
    ranking the 5-D vector relative to one or more other 5-D vectors, all of the 5-D vectors identifying the same production site VM; and
    restoring, at the cloud storage site, the production site VM identified in the 5-D vectors, and the production site VM restored at the cloud storage site has a VM restore instance type identified in the highest ranked 5-D vector.

2. The method as recited in claim 1, wherein the 4-D baseline vector is generic, with respect to a VM restore instance type, to a plurality of VMs at the production site.

3. The method as recited in claim 1, wherein each of the 5-D vectors is specific to a particular VM restore instance type.

4. The method as recited in claim 1, wherein the 4-D vector identifies the time needed to restore the test VM at the cloud storage site, and the cost to restore the test VM at the cloud storage site.

5. The method as recited in claim 4, wherein information in a 5-D vector concerning the time and cost to restore the VM identified in that 5-D vector is derived, respectively, from the time needed to restore the test VM at the cloud storage site, and the cost to restore the test VM at the cloud storage site.

6. The method as recited in claim 1, wherein the 5-D vectors are ranked based on a customer speed/cost tradeoff resolution policy.

7. The method as recited in claim 1, wherein restoring, at the cloud storage site, the production site VM identified in the 5-D vectors, comprises using a selected restore VM at the cloud storage site to perform one or more disaster recovery processes.

8. The method as recited in claim 1, wherein the 4-D baseline vector is generic to a plurality of VMs at the production site.

9. The method as recited in claim 1, wherein each of the 5-D vectors identifies a different respective VM restore instance type.

10. The method as recited in claim 1, wherein one or more of the recited processes are performed by, or at the direction of, a restore instance type evaluator that includes a performance cost evaluator, orchestrator, rule engine, scheduler, and repository.

11. A non-transitory storage medium having stored therein computer-executable instructions which, when executed by one or more hardware processors, perform the operations:

performing a VM restore instance type discovery process at a production site;

creating a test VM with a VM restore instance type that matches a VM restore instance type identified during performance of the discovery process;

using the test VM as a basis to create a test restore VM at a cloud storage site;

restoring the test VM at the cloud storage site using the test restore VM;

generating a 4-D baseline vector based on the restoration of the test VM, the 4-D baseline vector identifying a particular VM restore instance type;

generating a 5-D vector based on the 4-D baseline vector;

ranking the 5-D vector relative to one or more other 5-D vectors, all of the 5-D vectors identifying the same production site VM; and restoring, at the cloud storage site, the production site VM identified in the 5-D vectors, and the production site VM restored at the cloud storage site has a VM restore instance type identified in the highest ranked 5-D vector.

12. The non-transitory storage medium as recited in claim 11, wherein the 4-D baseline vector is generic, with respect to a VM restore instance type, to a plurality of VMs at the production site.

13. The non-transitory storage medium as recited in claim 11, wherein each of the 5-D vectors is specific to a particular VM restore instance type.

14. The non-transitory storage medium as recited in claim 11, wherein the 4-D vector identifies the time needed to restore the test VM at the cloud storage site, and the cost to restore the test VM at the cloud storage site.

15. The non-transitory storage medium as recited in claim 14, wherein information in a 5-D vector concerning the time and cost to restore the VM identified in that 5-D vector is derived, respectively, from the time needed to restore the test VM at the cloud storage site, and the cost to restore the test VM at the cloud storage site.

16. The non-transitory storage medium as recited in claim 11, wherein the 5-D vectors are ranked based on a customer speed/cost tradeoff resolution policy.

17. The non-transitory storage medium as recited in claim 11, wherein restoring, at the cloud storage site, the production site VM identified in the 5-D vectors, comprises using a selected restore VM at the cloud storage site to perform one or more disaster recovery processes.

18. The non-transitory storage medium as recited in claim 11, wherein the 4-D baseline vector is generic to a plurality of VMs at the production site.

19. The non-transitory storage medium as recited in claim 11, wherein each of the 5-D vectors identifies a different respective VM restore instance type.

20. The non-transitory storage medium as recited in claim 11, wherein one or more of the recited processes are performed by, or at the direction of, a restore instance type evaluator that includes a performance cost evaluator, orchestrator, rule engine, scheduler, and repository.

* * * * *